(No Model.) 2 Sheets—Sheet 1.
S. J. JOHNSON.
WOODEN SHINGLE AND PROCESS OF MAKING THE SAME.
No. 359,571. Patented Mar. 15, 1887.
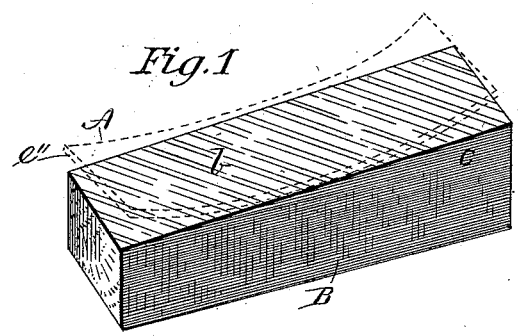
Fig. 1
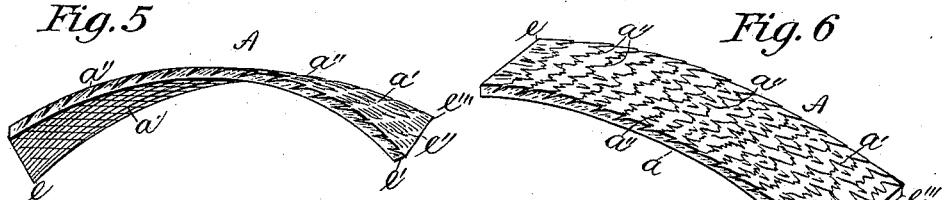
Fig. 5
Fig. 6
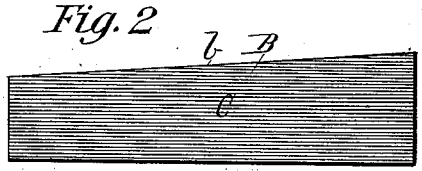
Fig. 2
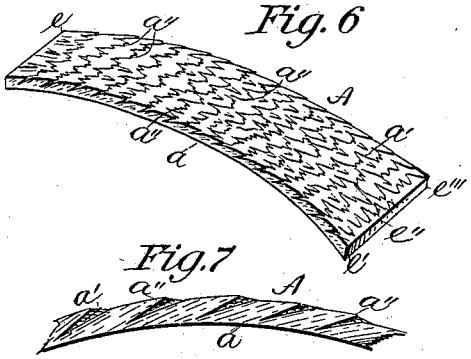
Fig. 7
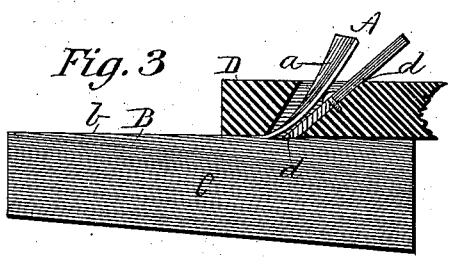
Fig. 3
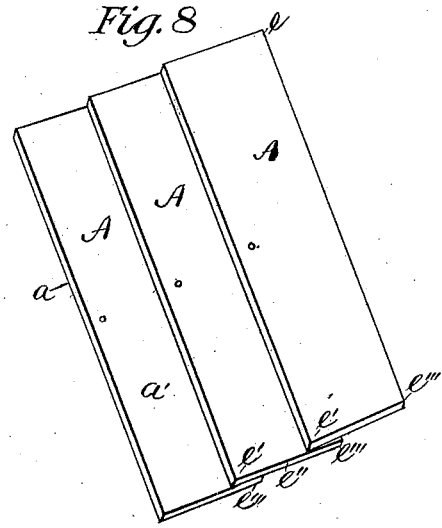
Fig. 8
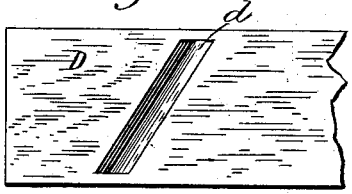
Fig. 4
Witnesses:
W. N. Rowe,
H. W. Richards.
Inventor:
Swen J. Johnson,
By W. B. Richards,
Atty.
N. PETERS, Photo-Lithographer, Washington, D. C.

(No Model.)  2 Sheets—Sheet 2.

S. J. JOHNSON.
WOODEN SHINGLE AND PROCESS OF MAKING THE SAME.

No. 359,571.  Patented Mar. 15, 1887.

Witnesses:
W. H. Rowe,
H. M. Richards.

Inventor:
Swen J. Johnson,
By W. B. Richards,
Atty.

UNITED STATES PATENT OFFICE.

SWEN J. JOHNSON, OF GALESBURG, ILL., ASSIGNOR OF TWO-THIRDS TO NELS O. G. JOHNSON AND ANDREW G. ANDERSON, BOTH OF SAME PLACE.

WOODEN SHINGLE AND PROCESS OF MAKING THE SAME.

SPECIFICATION forming part of Letters Patent No. 359,571, dated March 15, 1887.

Application filed January 7, 1887. Serial No. 223,671. (No model.)

*To all whom it may concern:*

Be it known that I, SWEN J. JOHNSON, a subject of the King of Sweden, residing at Galesburg, in the county of Knox and State of Illinois, have invented certain new and useful Improvements in Wooden Shingles and the Process of Making the Same, of which the following is a specification.

The object of my invention is to furnish wooden roofing-shingles which can be cheaply and rapidly made by a new process, hereinafter described, and which will be an improvement in many respects over any shingles heretofore constructed, principally from the facts that they will not warp in ordinary use, will not crack, are lighter and easier to handle and to apply on a roof, will last longer, and are cheaper.

The first part of my invention consists in a new process, a new mode of making shingles by means of which shingles are produced with a continuous unbroken concave surface on one side thereof and a broken convex surface on their opposite side; and the second part of my invention consists in a new product—a shingle formed as in general terms above described.

Figure 9:
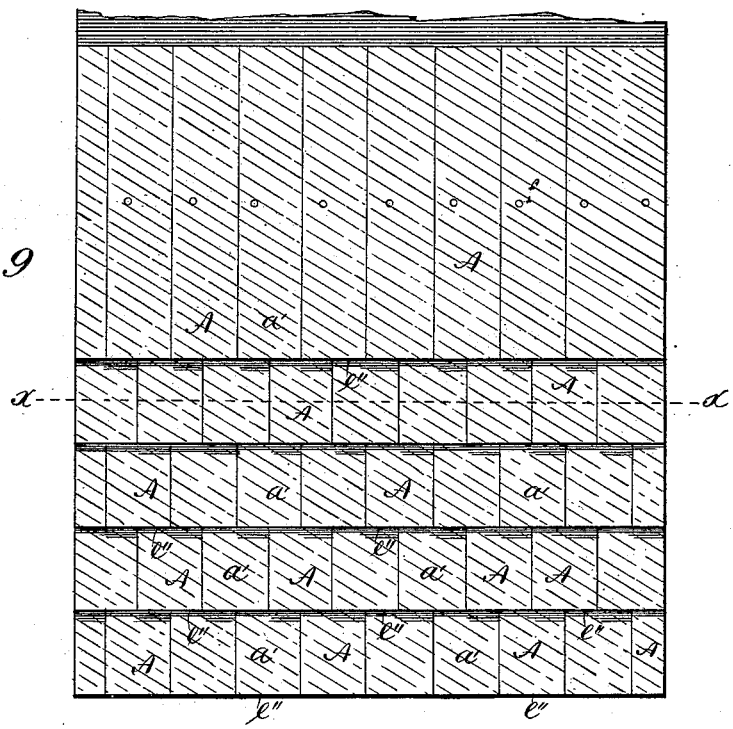
Figure 10:
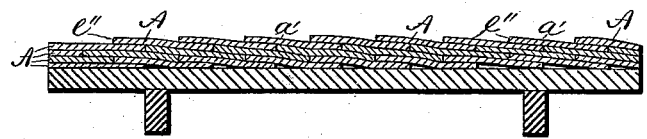
Figure 11:
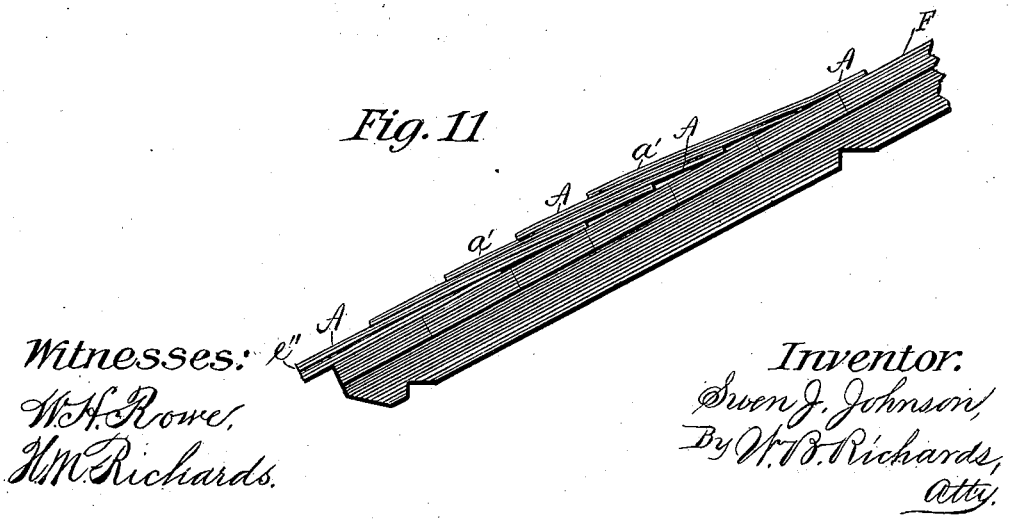

In the accompanying drawings, which illustrate my new shingle, the manner of "laying" them on a roof, and one mode by which the process of making them can be applied, Figure 1 is a perspective of the block from which my shingles are shaved; Fig. 2, a side elevation of the block; Fig. 3, a side elevation of the block and a sectional elevation of part of the shaving-knife; Fig. 4, a plan of part of the shaving-knife, seen from below; Fig. 5, a side elevation of one of my shingles; Fig. 6, a perspective of one of my shingles; Fig. 7, an enlarged side elevation of a part of one shingle; Fig. 8, a perspective illustrating the manner of laying the shingles; Fig. 9, a top plan of a part of a roof covered with my shingle; Fig. 10, a sectional elevation in the line $xx$ in Fig. 9; Fig. 11, a side elevation of part of roof shown at Fig. 9.

Referring to the drawings by letters, the same letter indicating the same part in the different figures, A represents the shingle, the form of which, when developed by flattening the shingle on a plane surface, is an oblong rectangle, or approximately such, as shown at Figs. 8 and 9, but which as manufactured and before use is a helix, as shown at Figs. 5 and 6, such as would be formed by bending said oblong rectangle spirally on a cylinder. The concave side $a$ of this shingle is unbroken wood, and the convex side $a'$ broken with the grain of the wood, so as to form overlapping feather-edges $a''$, as shown, magnified in proportion to other parts of the shingle, at Figs. 5, 6, and 7.

This helical-shaped shingle, with one surface of unbroken and the opposite surface of broken wood, is made as follows: The blocks B, from which the shingles are cut, are formed from the wood with one of their sides, $b$, oblique to the grain $c$ of the wood, which grain is shown by the parallel lines on the front sides of Figs. 1, 2, and 3. In cutting the shingles from the side $b$ of the block, planes D of various kinds may be used, the general principle being followed that the cutting-bit $d$ of the plane is oblique to the plane or to its line of movement lengthwise of the block B. At Fig. 4 a fragmental part of the lower surface of a suitable plane is shown, in which the cutting-bit, set similar to an ordinary oblique plane-bit, is shown, and in using which either the block B or the plane may have the necessary movement back and forth to do the cutting, in an evident manner, and as need not be further herein described, in view of the common use of planes with obliquely-arranged cutting-blades. The plane or block, or both, move in relative directions, as plainly indicated at Fig. 3, and as the shingle is cut from the block it will be given the helical form shown, together with the shown and described unbroken concave surface and broken convex surface. The blocks B are preferably steamed or otherwise moistened through before cutting.

In order to clearly and fully describe the manner of using these shingles, and thereby show their superiority, I will designate the drooping corners (see Fig. 5) by the letters $e$ $e'$, and the lower end of the shingle by the letter $e''$. They are laid on the roof (see Fig. 8) in such manner that the drooping corner $e'$ will always rest upon and press down a higher corner, $e'''$, and the drooping corners $e$ fit snugly and closely to the sheeting-boards F, when a single light nail, *f*, is used in each shingle. The further preferred manner of laying them is shown at Figs. 9, 10, and 11.

These shingles are very light, preferably only about one-eighth of an inch in thickness, and in length and breadth may vary in size as do ordinary shingles. Their broken surface will prevent them warping or cracking, while their complete surface will hold them together, and they will thus maintain a roof in good condition without leaking much longer than the ordinary shingle, while they at the same time produce a much smoother, better looking roof, and there is no difficulty in laying them, even by those unskilled in laying shingles. Their upper surfaces, when the shingles are laid, are smooth as commonly planed wood, and the overlapping feather-edges *a″* will completely shed and carry away water, while the closeness with which they fit the roof and fit each other will more effectually exclude the air and wind than ordinary shingles.

Having thus described my invention, what I claim as new, and desire to secure by Letters Patent, is—

1. A wooden shingle having a broken surface on one side and an unbroken surface on its other side, substantially as and for the purpose specified.

2. A wooden shingle having an unbroken concave surface on one side and a broken convex surface on its other side, substantially as described.

3. A wooden helical-shaped shingle having an unbroken surface on its concave side and a broken surface on its convex side, substantially as described.

4. The process herein described of making shingles, which consists, essentially, in shaving them with a cutter having a blade arranged obliquely to the shingle from a surface or surfaces on a block of wood oblique to the grain of the wood.

5. The process herein described of making helical-shaped shingles, which consists, essentially, in shaving them from a surface or surfaces on blocks of wood, which surface or surfaces are oblique to the grain of the wood, and with a cutter, substantially such as herein described.

In testimony whereof I affix my signature in presence of two witnesses.

SWEN J. JOHNSON.

Witnesses:
N. O. G. JOHNSON,
H. M. RICHARDS.